(No Model.) 2 Sheets—Sheet 1.

R. WELS.
FRICTION CLUTCH.

No. 285,940. Patented Oct. 2, 1883.

Witnesses:
John C. Tunbridge
John M. Speer

Inventor:
Richard Wels
by his attorneys
Briesen & Steele (No Model.)  2 Sheets—Sheet 2.

R. WELS.

FRICTION CLUTCH.

No. 285,940. Patented Oct. 2, 1883.

Witnesses
John C. Tunbridge,
John M. Speer.

Inventor:
Richard Wels
by his attorneys
Briesen & Steele

UNITED STATES PATENT OFFICE.

RICHARD WELS, OF DESSAU, GERMANY.

FRICTION-CLUTCH.

SPECIFICATION forming part of Letters Patent No. 285,940, dated October 2, 1883.

Application filed July 13, 1883. (No model.)

*To all whom it may concern:*

Be it known that I, RICHARD WELS, of Dessau, Germany, have invented an Improved Friction-Clutch, of which the following is a specification.

Figure 1:
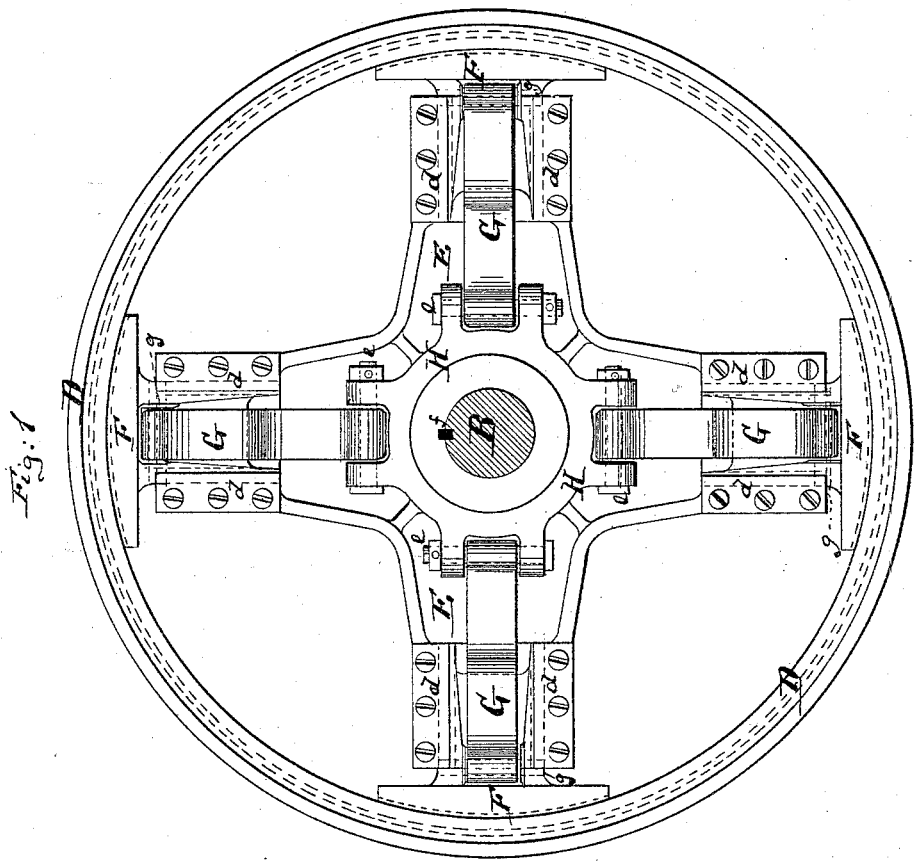
Figure 2:
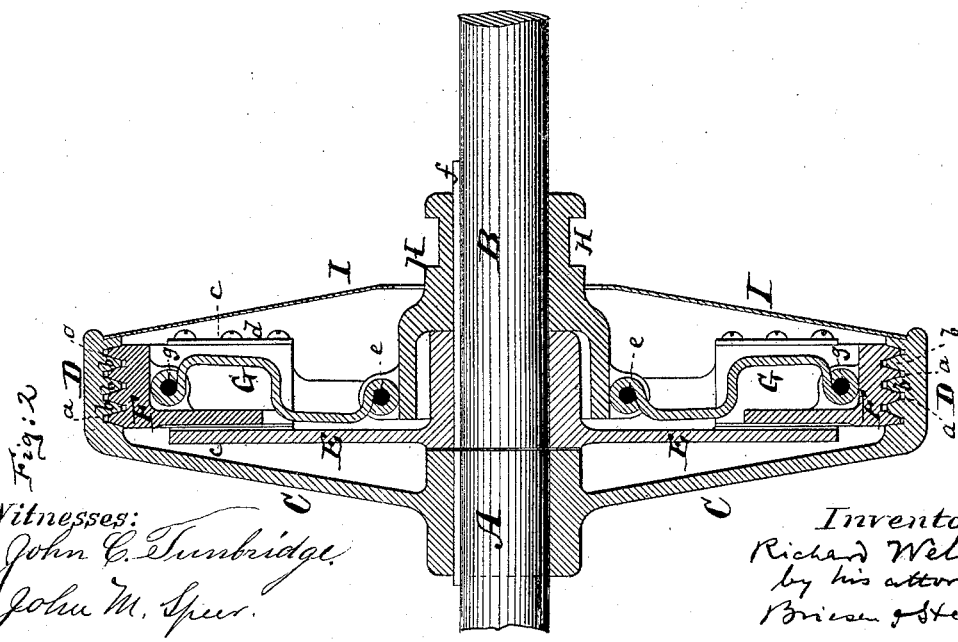
Figure 3:
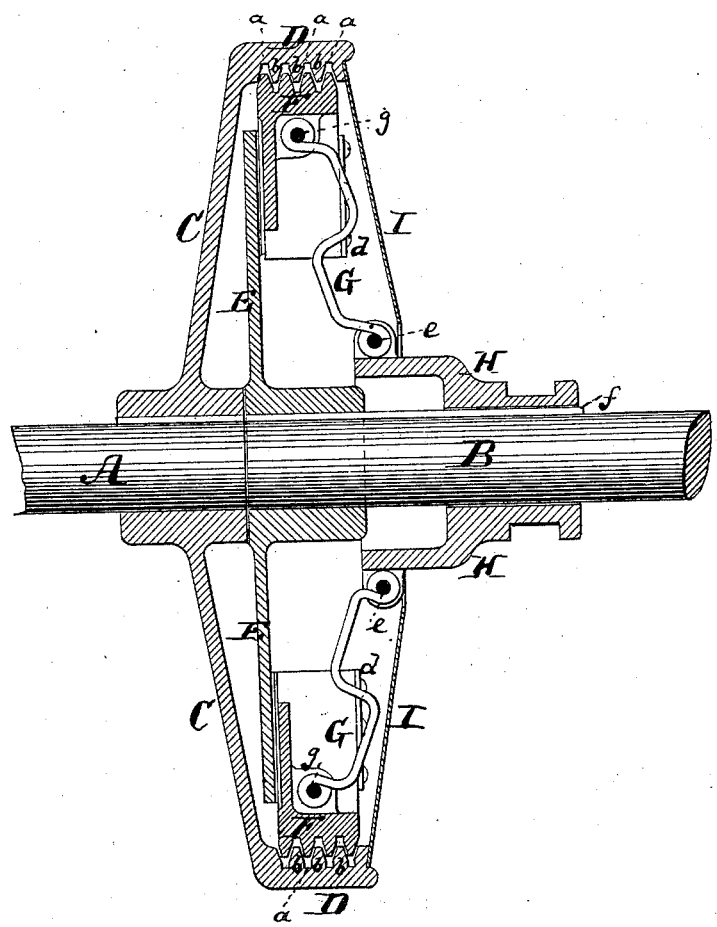
Figure 4:
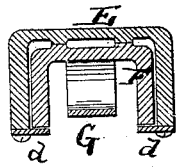

Figure 1 is a face view of my improved clutch. Fig. 2 is a vertical central section through the same, showing it in engagement. Fig. 3 is a similar section of the same, showing it disengaged; and Fig. 4 is a detail cross-section on the line *c c*, Fig. 2.

This invention relates to a friction clutch or coupling which can be used for readily connecting a revolving shaft with another shaft to impart motion to the latter, or for disconnecting the two shafts when they are running together.

The invention consists in the new combination of parts hereinafter more fully specified.

A in the drawings is one of the shafts, and B the other. The shaft B has rotary motion imparted to it by suitable means—in other words, is the driving-shaft—and has keyed to it, so that it will carry around with it, a disk, C, which, at its outer periphery, carries a flange, D. This flange or ring D, on its inner side, has series of parallel grooves and intervening ribs *a* and *b*, as shown, said grooves and ribs lying in planes that cross the axis of the shaft A at right angles. Upon the shaft B is likewise securely fastened a disk or cross, E, which, when the two shafts are aligned, as in Figs. 2 and 3, will come near to the disk C without touching it, and is of smaller diameter than the ring or flange D. The said disk or cross-shaped attachment of the shaft B has two or more radial channels formed on its face, and partly covered by means of guide-plates *d d*, or otherwise, into which channels are fitted radially-sliding blocks F, whose outer ends are ribbed and grooved in manner corresponding to the grooves and ribs *a b* of the ring or flange D—that is to say, each projecting rib on the block F will be in line with one of the grooves *a* of the ring D, the said grooved and ribbed outer end of the block F being so grooved and ribbed peripherally, as shown in Fig. 1. Each block F is pivotally connected by a pin, *g*, with a spring, G, the inner end of which spring is pivotally connected again at *e* with a sliding collar, H, that is fitted upon the shaft B, so as to be easily moved lengthwise thereon, but prevented by a feather, *f*, on said shaft from turning independently therefrom. Whenever the sliding collar H is moved against the disk E as far as it can be moved in that direction—that is to say, into the position shown in Fig. 2—it will bring the two pivots of each spring G nearer together, thereby compressing said springs and causing them to force the ribs at the ends of the blocks F into the grooves of the ring D, as in Fig. 2, the frictional contact thus produced being sufficient to cause the revolving ring D to carry the shaft B around with it; but whenever the sliding collar is moved away from the disk E, as in Fig. 3, the springs will be distended, and will, moreover, be caused to draw the blocks F away from the ring D sufficiently far to destroy the frictional contact, leaving the shaft B loose or disconnected from the shaft A.

Although it is more convenient to mount the disk C, with its ring D, upon the driving-shaft A, the apparatus will also operate if B were the driving-shaft and A the loose shaft.

Fig. 4 shows the preferable form in cross-section of the arm of the cross E, in which the block F slides and in which it is held by the guide-plates *d*.

It is not necessary that the inner face of the ring or flange D should be ribbed and grooved, nor that the outer end of the block F should be grooved and ribbed, as the apparatus will also work if the contact-faces of the parts D and F are left without ribs and grooves on one or both of them; but tapering ribs have been found preferable, because they enlarge the frictional contact-surface of the parts that are to be connected.

It will be perceived, from an inspection of Fig. 2, that the inner pivot, *e*, of each spring, in the locking or contact position of the clutch, is beyond the vertical plane of the outer pivot, *g*, *i. e.*, is nearer to the disk E than the outer pivot, *g*, which connects that spring with the sliding block F, and it follows that the spring itself cannot spontaneously, by its effort toward expansion, throw the sliding collar H back into the position which is shown in Fig. 3. In other words, by bringing the pin *e* nearer to the shaft A than the pin *g*, the apparatus is made self-locking.

The invention is also useful in the form described if the parts A and B are one single shaft, upon which the wheel C, having the ring or collar D, revolves loosely, provided said ring or collar is a pulley or toothed wheel, to which rotary motion is imparted by suitable means, such rotary motion being then transmitted from said pulley to the single shaft A B by means of the sliding blocks F and mechanism already described; or the single shaft A B would transmit motion by this coupling-connection to the loose pulley C D in such a case.

For practical use a dust-shield, I, may be attached to the ring or collar D on the side opposite to the wheel C, as shown, which shield will prevent dust and other matter from flying between the frictional contact-surfaces of the parts D and F and interfering with the proper operation of the mechanism hereinbefore specified.

I claim—

1. The combination of the internally-grooved ring or collar D with the externally-grooved sliding blocks F F, pivoted springs G G, and sliding collar H on shaft B, substantially as and for the purpose described.

2. The combination of the sliding collar H on shaft B with the pivoted spring G, sliding block F, guide disk or cross E, and outer ring or collar, D, for operation as described, all arranged so that when the parts D and F are in frictional contact the inner pivot, e, of the spring will be thrown beyond the vertical plane of the outer pivot, g, of said spring, substantially as specified.

RICHARD WELS.

Witnesses:
WILLY G. E. SCHULTZ,
HARRY SMITH.